(12) United States Patent
Abram et al.

(10) Patent No.: US 12,041,983 B2
(45) Date of Patent: Jul. 23, 2024

(54) IMPACT MITIGATING MEMBRANE

(71) Applicant: SIMON FRASER UNIVERSITY, Burnaby (CA)

(72) Inventors: Daniel Eamon Abram, Vancouver (CA); Farid Golnaraghi, West Vancouver (CA); Gaofeng Gary Wang, Surrey (CA)

(73) Assignee: Simon Fraser University, Burnaby (CA)

( * ) Notice: Subject to any disclaimer, the term of this patent is extended or adjusted under 35 U.S.C. 154(b) by 931 days.

(21) Appl. No.: 16/491,803

(22) PCT Filed: Mar. 6, 2018

(86) PCT No.: PCT/CA2018/050265
§ 371 (c)(1),
(2) Date: Sep. 6, 2019

(87) PCT Pub. No.: WO2018/161162
PCT Pub. Date: Sep. 13, 2018

(65) Prior Publication Data
US 2021/0137184 A1    May 13, 2021

Related U.S. Application Data

(60) Provisional application No. 62/467,404, filed on Mar. 6, 2017.

(51) Int. Cl.
*A41D 13/015* (2006.01)
*A42B 3/06* (2006.01)
(Continued)

(52) U.S. Cl.
CPC ............ *A41D 13/015* (2013.01); *A42B 3/064* (2013.01); *A42B 3/121* (2013.01); *A42B 3/127* (2013.01);
(Continued)

(58) Field of Classification Search
CPC .............. A41D 13/015; A41D 13/0153; A41D 13/0158; A42B 3/064; A42B 3/063; A42B 3/121; A42B 3/127; B32B 3/266
See application file for complete search history.

(56) References Cited

U.S. PATENT DOCUMENTS

| 4,179,752 A | 12/1979 | Fackelmann |
| 6,497,183 B2 | 12/2002 | Demarquilly et al. |

(Continued)

FOREIGN PATENT DOCUMENTS

| CA | 2 874 768 A1 | 1/2013 |
| CN | 102811639 A | 12/2012 |

(Continued)

OTHER PUBLICATIONS

First Chinese Office Action mailed Feb. 26, 2021, issued in corresponding Application No. 201880030016.3, filed on Mar. 6, 2018, and its English translation thereof, 22 pages.

(Continued)

*Primary Examiner* — Zachary M Davis
(74) *Attorney, Agent, or Firm* — Christensen O'Connor Johnson Kindness PLLC

(57) ABSTRACT

Generally described, aspects of the disclosed subject matter are directed to impact mitigating membranes. In accordance with aspects of the present disclosure, the impact mitigating membranes generally include a laminar core having a first lamina and a second lamina coupled to the first lamina and configured to shift relative to the first lamina to dissipate kinetic energy resulting from an oblique impact force. The laminar core may include a lubricating layer or self-lubrication between the lamina to reduce friction. In general, the laminar core is surrounded by first and second encapsulating layers positioned adjacent each lamina. An anchoring attachment coupled to one or more of the first and second encapsulating layer and associating with the laminar core (Continued)

constrains relative lateral motion between the laminar core and the first and second encapsulating layers.

18 Claims, 14 Drawing Sheets

(51) Int. Cl.

| | | |
|---|---|---|
| A42B 3/12 | (2006.01) | |
| B32B 3/26 | (2006.01) | |
| B32B 5/18 | (2006.01) | |
| B32B 5/24 | (2006.01) | |
| B32B 5/26 | (2006.01) | |
| B32B 7/12 | (2006.01) | |
| B32B 25/04 | (2006.01) | |
| B32B 25/08 | (2006.01) | |
| B32B 25/10 | (2006.01) | |
| B32B 25/20 | (2006.01) | |
| B32B 27/06 | (2006.01) | |
| B32B 27/08 | (2006.01) | |
| B32B 27/12 | (2006.01) | |
| A63B 71/12 | (2006.01) | |

(52) U.S. Cl.
CPC ............... *B32B 3/266* (2013.01); *B32B 5/18* (2013.01); *B32B 5/245* (2013.01); *B32B 5/26* (2013.01); *B32B 7/12* (2013.01); *B32B 25/045* (2013.01); *B32B 25/08* (2013.01); *B32B 25/10* (2013.01); *B32B 25/20* (2013.01); *B32B 27/065* (2013.01); *B32B 27/08* (2013.01); *B32B 27/12* (2013.01); *A63B 71/1225* (2013.01); *A63B 2071/1233* (2013.01); *A63B 2071/1241* (2013.01); *A63B 2071/125* (2013.01); *A63B 2071/1258* (2013.01); *A63B 2071/1275* (2013.01); *A63B 2071/1283* (2013.01); *A63B 71/1291* (2013.01); *A63B 2209/00* (2013.01); *B32B 2250/05* (2013.01); *B32B 2307/51* (2013.01); *B32B 2307/56* (2013.01); *B32B 2307/712* (2013.01); *B32B 2307/724* (2013.01); *B32B 2307/7265* (2013.01); *B32B 2437/04* (2013.01); *B32B 2571/00* (2013.01); *B32B 2605/003* (2013.01)

(56) References Cited

U.S. PATENT DOCUMENTS

| | | | |
|---|---|---|---|
| 6,658,671 B1* | 12/2003 | Von Holst | A42B 3/064 |
| | | | 2/412 |
| 6,761,960 B2 | 7/2004 | De Luca et al. | |
| 8,615,817 B2 | 12/2013 | Phillips | |
| 9,232,824 B2 | 1/2016 | Golnaraghi et al. | |
| 2002/0002730 A1* | 1/2002 | Dennis | A42B 3/12 |
| | | | 2/411 |
| 2002/0117835 A1* | 8/2002 | Schneider | B60R 21/2338 |
| | | | 280/728.2 |
| 2004/0250340 A1 | 12/2004 | Piper et al. | |
| 2005/0067816 A1* | 3/2005 | Buckman | A61B 5/6805 |
| | | | 280/730.1 |
| 2013/0247284 A1 | 9/2013 | Hoshizaki et al. | |
| 2016/0120256 A1 | 5/2016 | Golnaraghi et al. | |

FOREIGN PATENT DOCUMENTS

| | | |
|---|---|---|
| EP | 3117726 A1 | 1/2017 |
| WO | 2011087435 A1 | 7/2011 |
| WO | 2013/013180 A1 | 1/2013 |

OTHER PUBLICATIONS

International Search Report for PCT/CA2018/050265 with International Filing Date of Mar. 6, 2018, mailed May 24, 2018 (3 pages).
Written Opinion of the International Searching Authority for PCT/CA2018/050265 with International Filing Date of Mar. 6, 2018, mailed May 24, 2018 (8 pages).
European Search Report received for EP 18764051.1, with International Filing Date of Mar. 6, 2018, mailed Dec. 14, 2020, 7 pages.

* cited by examiner

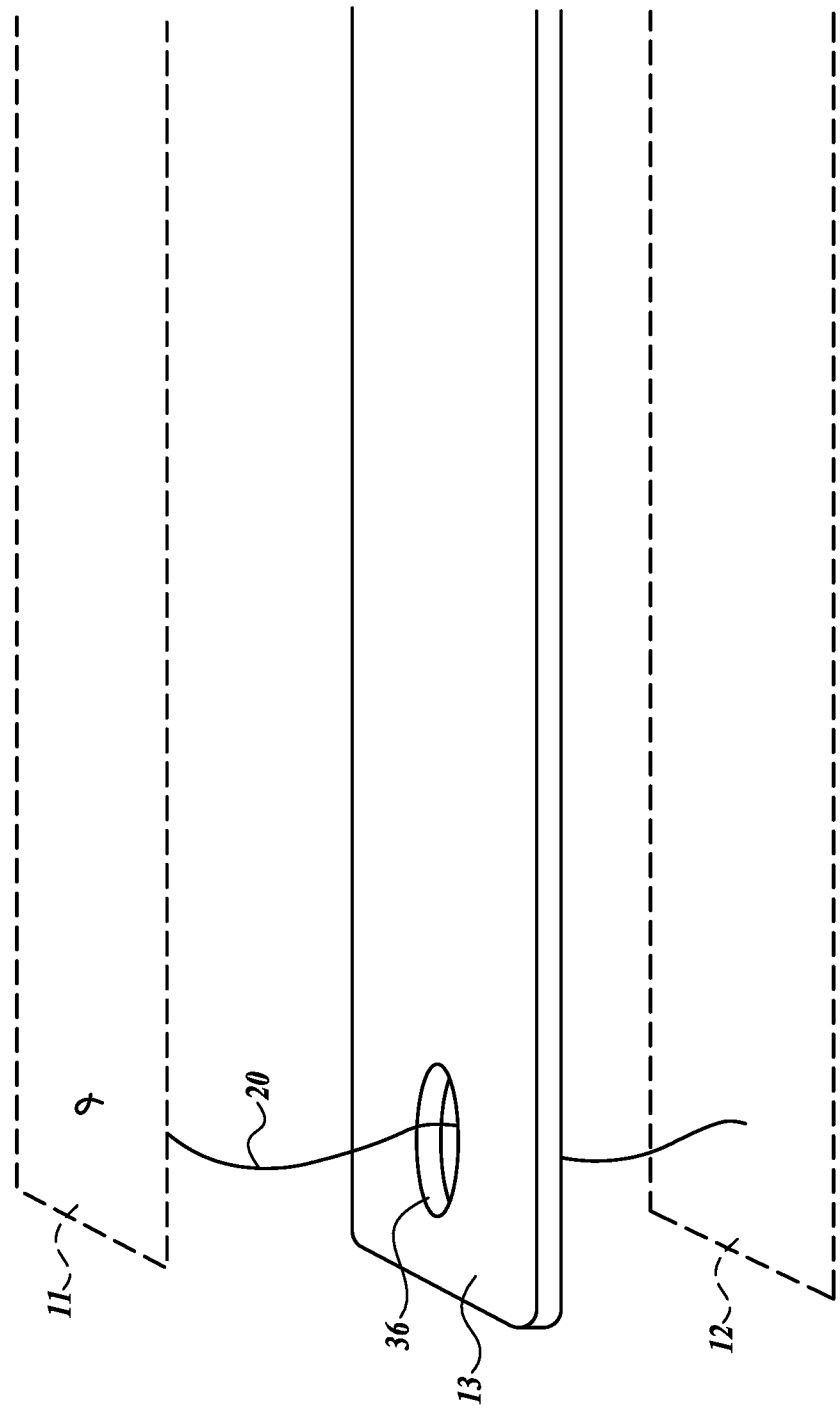

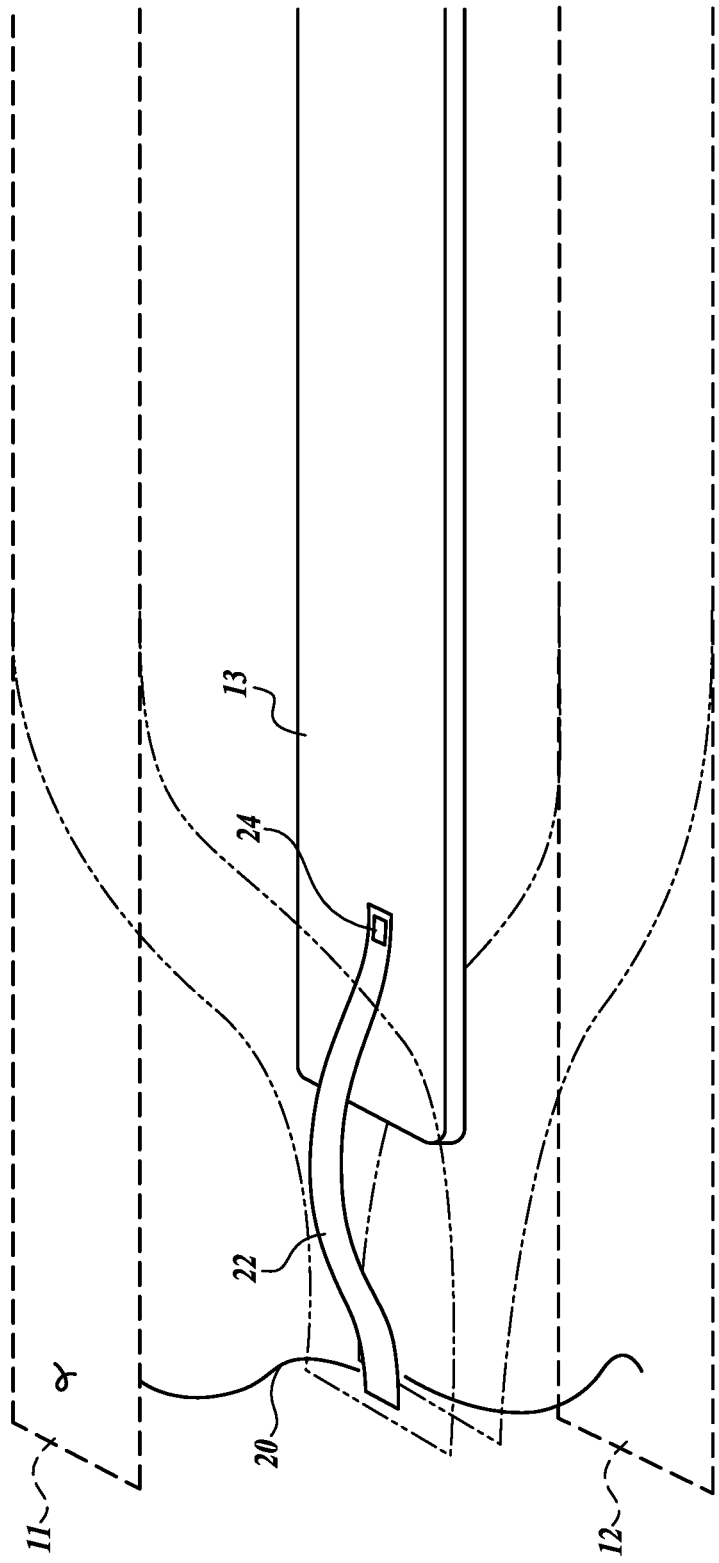

IMPACT MITIGATING MEMBRANE

CROSS-REFERENCE TO RELATED APPLICATION

This application claims the benefit of Provisional Application No. 62/467,404, filed Mar. 6, 2017, the disclosure of which is incorporated herein by reference in its entirety.

BACKGROUND

Impacts to an object generally strike obliquely, causing the impacted object to experience a combination of linear and rotational accelerations. The accelerations resulting from the oblique impact can be destructive to the impacted object. To enhance the protection efficiency when using protective equipment, consideration should be given to mitigate both linear and rotational accelerations.

Currently, standard protective equipment is designed, tested, and certified based primarily on directionally normal impacts, causing only linear acceleration. As a result, the equipment can lack the ability to systematically mitigate rotational acceleration, leaving the impacted object vulnerable to further damage. In one use, the protective equipment may be worn on various areas of the human body, providing protection to, for example, the head, neck, shoulders, upper arms, elbows, forearms, wrists, hands, chest, back, spine, hips, thighs, knees, shins, ankles, and feet.

In the instance of the human head, traumatic brain injuries are among the most prevalent and fatal injuries in contact sports, and many other high-risk activities, where a combination of linear and rotational accelerations is common. Rotational acceleration is often an overlooked component that causes head injuries and concussions in contact sports and activities, such as football, soccer, cycling, hockey, snowboarding, skiing, construction, and industrial and military activities.

significantly more damage to brain cells than directionally normal forces. Some studies show that human brain tissue is approximately one million times more sensitive to shear force than a compression force applied during an impact.

Therefore, a need exists for improved protective equipment that effectively reduces rotational and linear acceleration experienced by an object during an oblique impact. Embodiments of the present disclosure are directed to fulfilling these and other needs.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 7A-C are partial detail perspective views of representative embodiments of the impact mitigating membrane of FIG. 1, showing embodiments of the anchoring attachment;

DETAILED DESCRIPTION

Figure 1:
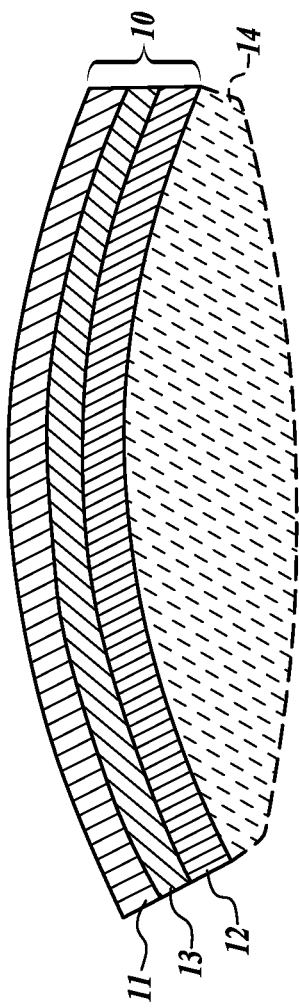
FIG. 1 is a partial cross-sectional view of one representative embodiment of an impact mitigating membrane in accordance with an aspect of the present disclosure, showing a laminar core between encapsulating layers.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to modular impact mitigating membranes providing mitigation for oblique impact forces to an object. In some embodiments, the object described herein is a living body or any portion of a living body, human or animal, or any protective equipment designed to protect portions of a living body. In other embodiments, the object is a non-living body, such as sensitive equipment, machineries, or any part thereof.

When an oblique impact force is applied to an impact mitigating membrane covering the surface of an object, a relative motion between layers of the impact mitigating membrane is beneficially allowed to mitigate the transfer the kinetic energy tangential to the surface of the object. In some embodiments, the impact mitigating membrane dissipates a portion of the tangential component of the oblique impact force that would tend to cause rotational acceleration transfer to the object. In an example where the object is the head of a human or animal, excessive rotational acceleration transfer can cause traumatic brain injuries. In other embodiments, the impact mitigating membrane dissipates a portion of the normal component of the oblique impact force that would cause linear acceleration transfer to the object. In further embodiments, the impact mitigating membrane dissipates portions of both the normal and tangential components of the oblique impact force that would cause linear and rotational acceleration transfer to the object.

In embodiments disclosed herein, the impact mitigating membrane of the present disclosure is capable of spreading the normal component of the oblique impact force over a larger area, reducing the concentration of impact forces transferring to the object. In this regard, some embodiments of the present disclosure are capable of use in conjunction with energy absorbing materials, such as foam, non-Newtonian fluid, compressible materials, rigid materials, and combinations thereof, among other suitable materials, to further reduce the effects of the oblique impact force on the object.

Turning to FIG. 1, a portion of one representative embodiment of an impact mitigating membrane 10 covering the surface of an object 14 is shown. The impact mitigating membrane 10 generally includes a laminar core 13 adjacent a first encapsulating layer 11 and a second encapsulating layer 12.

Figure 3:
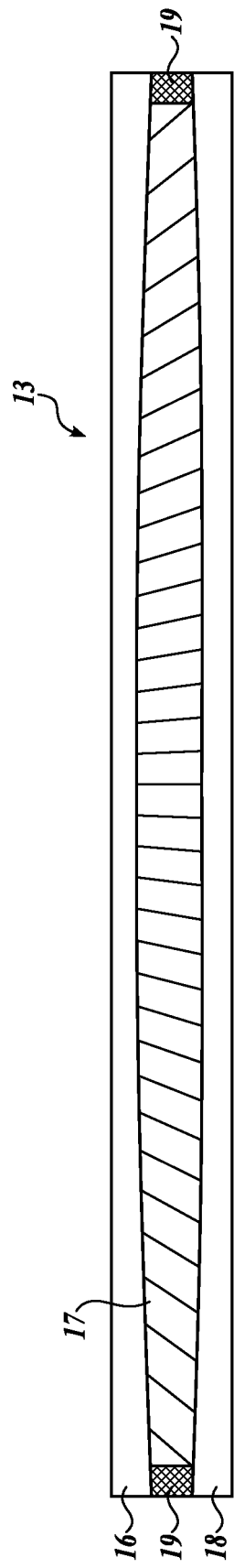
FIG. 3 is a cross-sectional view of the laminar core of the impact mitigating membrane of FIG. 1, showing an embodiment having two lamina.

The laminar core 13 will now be described in greater detail. As shown in FIG. 3, the laminar core 13 generally includes a first lamina 16, an intermediate lubricating layer 17, and a second lamina 18. During an oblique impact to the impact mitigating membrane 10, the first lamina 16 shifts laterally relative to the second lamina 18 such that the kinetic energy transferred in a tangential direction to the surface of the object 14 is reduced. The tendency of the first lamina 16 and the second lamina 18 to shift during the oblique impact can be enhanced by including the intermediate lubricating layer 17 therebetween. In some embodiments, the first lamina 16 and the second lamina 18 of the laminar core 13 are manufactured from a self-lubricating material which can allow effective reduction of the tangential component of the oblique impact force without an additional intermediate lubricating layer 17. In further embodiments, the intermediate lubricating layer 17 is manufactured from at least one layer of gas, liquid, solid, colloid, ferrofluid, or any combination thereof. In still further embodiments, the intermediate lubricating layer 17 is manufactured from a combination of Newtonian fluids and non-Newtonian fluids. Suitable materials for various layers of the impact mitigating membrane 10 will now be described in greater detail.

In some embodiments, the first encapsulating layer 11 and the second encapsulating layer 12 are constructed from one or more layers of comfortable wearing, breathable, weatherproof, windproof, or waterproof material, or any combination of suitable materials. In other embodiments, one or both of the first encapsulating layer 11 and the second encapsulating layer 12 are suitably manufactured with impact reinforcement, such as by using flexible or rigid impact dissipating materials in the manufacturing process. As a further consideration, in some embodiments, ventilation is provided through at least one of the first encapsulating layer 11 and the second encapsulating layer 12 in any suitable pattern to facilitate air circulation through the impact mitigating membrane 10.

In some embodiments, the first encapsulating layer 11, the second encapsulating layer 12, and the first lamina 16 and second lamina 18 of the laminar core 13 are suitably manufactured from one or more layers of fabrics (e.g., cotton, synthetic, polyester, silk, linen, wool, nylon (such as ZYTEL®), spandex, and other textile materials), thermosetting plastics, polycarbonate, plastic polymers, thermoplastics (such as CELSTRAN®), carbon fiber composites, para-aramid synthetic fibers (such as KEVLAR®), composites, thermoset elastomers, polypropylene, acrylonitrile butadiene styrene (ABS), expanded polystyrene (EPS), high density polyethylene (HDPE), glass reinforced plastics, or any other energy absorbing or force spreading material including, but is not limited to, silicon rubber, vinyl, polyvinyl chloride (PVC), thermoplastic polyurethane (TPU), polyurethane (PU). In other embodiments, the first lamina 16 and the second lamina 18 are manufactured from any combination of elastic, flexible, stretchable, or rigid materials that are capable of elongation to the point of rupture when the impact force exceeds a threshold. In one embodiment, a padded material is integrated into one or more of the first encapsulating layer 11 and the second encapsulating layer 12 of the impact mitigating membrane 10.

Figure 2:
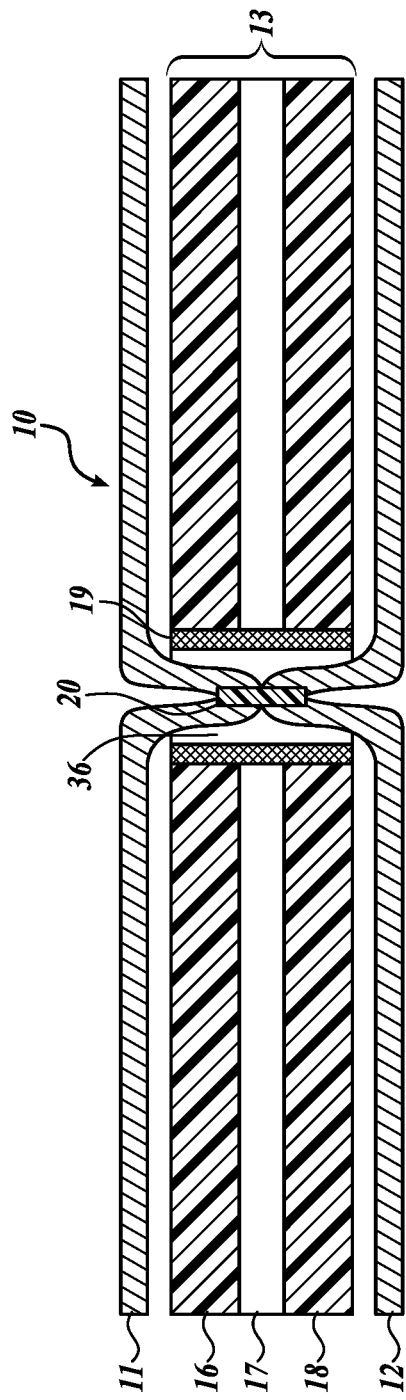
FIG. 2 is a partial cross-sectional view of an exemplary configuration of the impact mitigating membrane of FIG. 1, showing an aperture through the impact mitigating membrane having an anchoring attachment therethrough.

In one embodiment, as shown in FIGS. 2 and 3, the first lamina 16 and the second lamina 18 of the laminar core 13 are coupled at least at the edges by means of a fastener 19. The fastener 19 is any suitable mechanical or chemical fastener. As a result of the addition of the fastener 19, the edges of the first lamina 16 and the second lamina 18 remain substantially aligned during installation, shipping, movement, wearing, adjustment, and certain impacts to the laminar core 13. In the embodiment shown in FIG. 3, the outer edges of the laminar core 13 are coupled using a fastener 19, such as a mechanical fastener, including thread using sewing techniques, buttons, rivets, hook and loop, metallic coupling, co-molding, co-melting, heat seal, fusion, ultrasonic welding, radio frequency (RF) sealing, or the like, or a chemical fastener including an adhesive or the like. As depicted in FIG. 3, the fastener 19 at the outer edges of the laminar core 13 forms a pouch-like configuration of the laminar core 13. In some embodiments, the fastener 19 couples the first lamina 16 and the second lamina 18 in intermittent locations or in a segmented manner, forming a dotted connection, or in a continuous manner, forming a line connection, or a combination thereof. The aforementioned fastening configurations of the fastener 19 may be formed in different shapes or densities.

Figure 6:
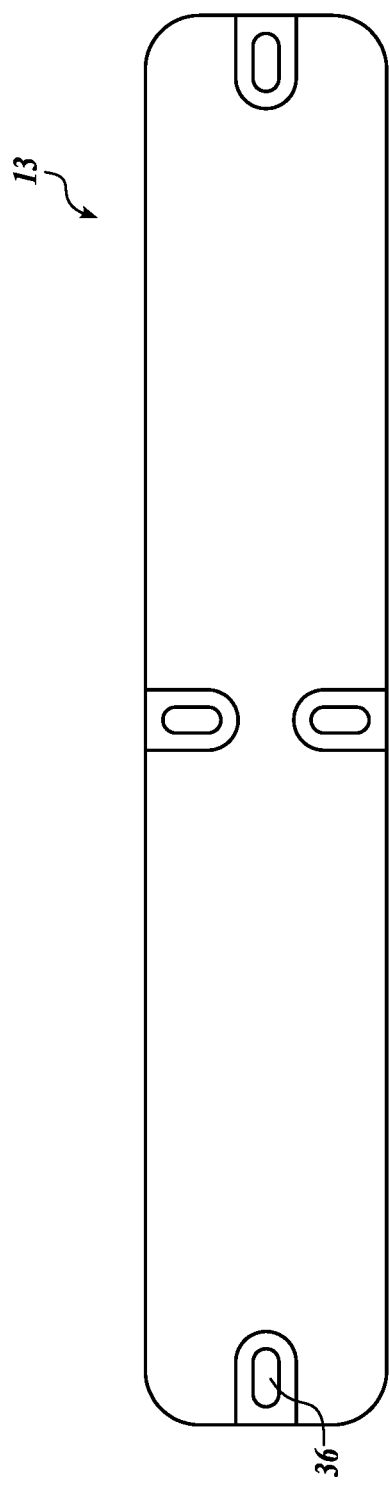
FIG. 6 is a top view of another representative embodiment of the impact mitigating membrane of FIG. 1, showing the laminar core with a plurality of apertures configured to anchor the laminar core with the encapsulating layers.

In the embodiment shown in FIG. 2, the fastener 19 is located at the edge of an aperture 36 through the laminar core 13. The aperture 36 in the laminar core 13 is suitably sized and configured to allow a through fastening component, such as an anchoring attachment 20, from the first encapsulating layer 11, through the aperture 36, and to the second encapsulating layer 12 (see also, FIG. 7A). The configuration of the anchoring attachment 20 with respect to the aperture 36 is such that the laminar core 13 does not significantly shift laterally with respect to the first encapsulating layer 11 or the second encapsulating layer 12 during use. Placing an anchoring attachment 20 or aperture 36 creates constrained flotation of the laminar core 13 inside the first encapsulating layer 11 and second encapsulating layer 12, without allowing the laminar core 13 to displace significantly laterally, fold, or otherwise deform inside the first and second encapsulating layers 11 and 12. The constrained floatation of the laminar core 13 allows the first encapsulating layer 11 and second encapsulating layer 12 to stretch independently from the laminar core 13, which improves comfort, ventilation, and stretch of the impact mitigating membrane for apparel and wearable applications. In some embodiments, as shown in FIG. 6, a plurality of apertures 36 are placed in the laminar core 13 to provide multiple locations for anchoring attachments 20 to constrain the floatation of the laminar core 13.

In some embodiments, the anchoring attachment 20 is suitably any size of area or point such that that the laminar core 13 does not shift significantly laterally with respect to the first encapsulating layer 11 or the second encapsulating layer 12 during use. In this regard, a smaller anchoring attachment 20 used in conjunction with a larger aperture 36 will allow greater lateral shift, while a larger anchoring attachment 20 used in conjunction with a smaller aperture 36 will reduce lateral shift.

Several examples of constraining the floatation of the laminar core 13 will now be described in greater detail. As described above and shown more clearly in FIG. 7A, in one embodiment, the anchoring attachment 20 provides a coupling for the first encapsulating layer 11 and the second encapsulating layer 12 through the aperture 36, providing lateral constraint of the laminar core 13. In some embodiments, the anchoring attachment 20 is sewn with a thread using any suitable sewing technique. In other embodiments, the anchoring attachment 20 is a mechanical fastener, chemical fastener, elastic band, rivet, adhesive, button, fusion, hook and loop, radio frequency seal, ultrasonic weld, thermal impulse seal, and any combinations thereof.

Figure 7B:
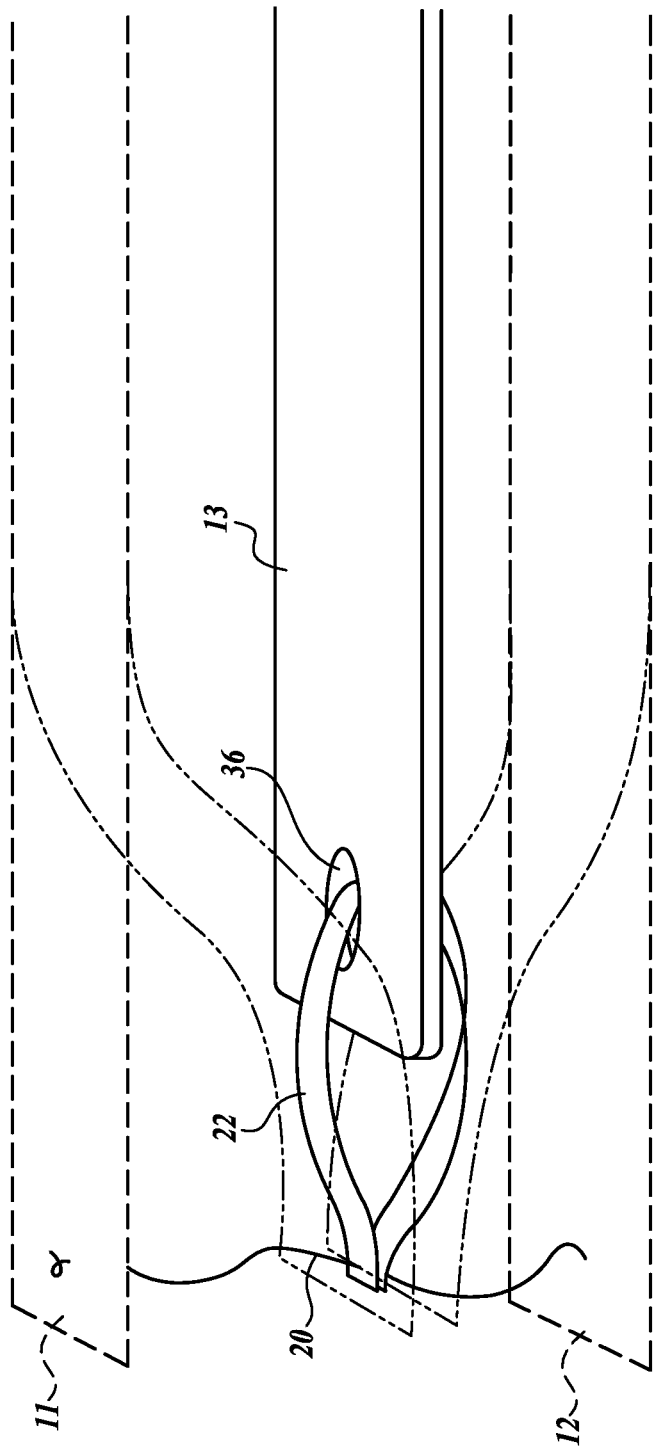

In other embodiments shown in FIGS. 7B and 7C, the anchoring attachment 20 extends from the first encapsulating layer 11, through a tether 22, to the second encapsulating layer 12. In the illustrated embodiment of FIG. 7B, the tether 22 is looped through the aperture 36 to provide lateral constraint for the laminar core 13. In the illustrated embodiment of FIG. 7C, the tether 22 is coupled to the laminar core 13 using a coupling 24 at one end. In these embodiments, the coupling 24 may suitably comprise any of the mechanical or chemical fasteners disclosed herein. The tether 22 is manufactured from any suitably elastic or inelastic material, such as thread using sewing techniques, rubber, fabric, plastic, metal, or any material disclosed herein for the layers of the impact mitigating membrane 10. Similarly, the anchoring attachment 20 of FIGS. 7B and 7C may include any aforementioned attachment components, such as thread using sewing techniques and elastic band. In one embodiment, the anchoring attachment 20 is removable such that the laminar core 13 is replaceable.

Figure 4:
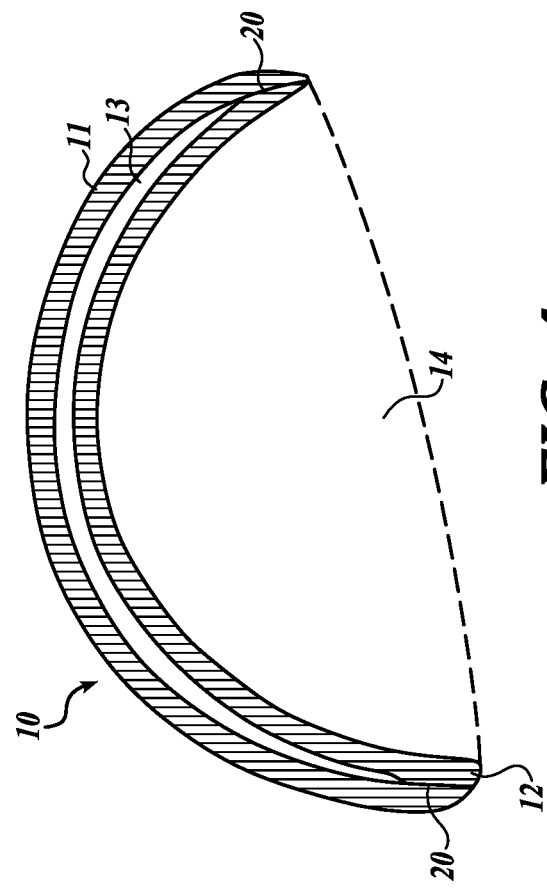
FIG. 4 is a cross sectional view of another representative embodiment of the impact mitigating membrane of FIG. 1, showing a connection between the first encapsulating layer and the second encapsulating layer around the perimeter of the laminar core.

In embodiments herein, the impact mitigating membrane 10 is configured for modularity, such that the impact mitigating membrane 10 is adaptable for a wide variety of protective applications. In this regard, the dimensions of each layer are suitably adjusted to fit a variety of applications. In one illustrated example shown in FIG. 4, the impact mitigating membrane 10 covers the outer surface of a protected object 14.

Figure 5A:
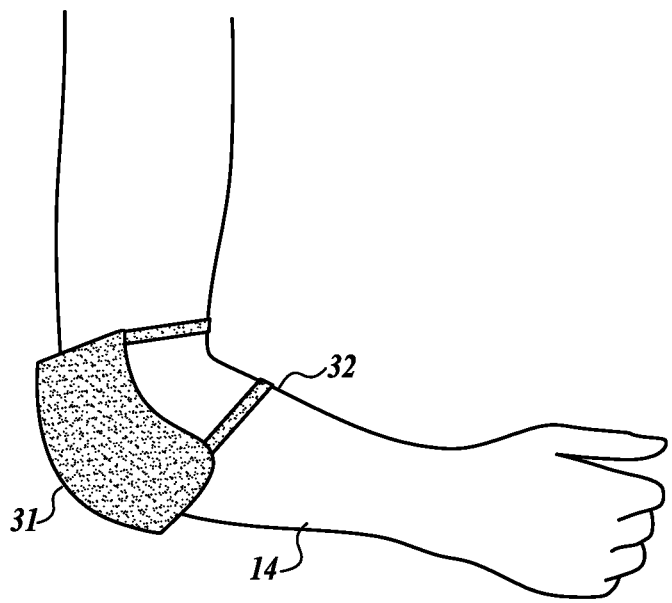
FIG. 5A is a representative configuration of the impact mitigating membrane of FIG. 1, showing an elbow protection configuration.
Figure 5B:
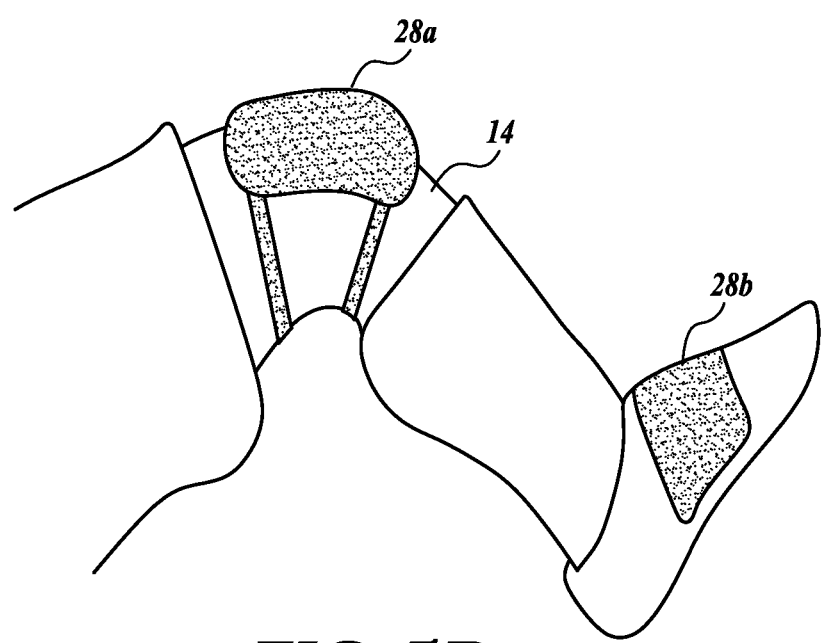
FIG. 5B is a representative configuration of the impact mitigating membrane of FIG. 1, showing knee and foot protection configurations.
Figure 5C:
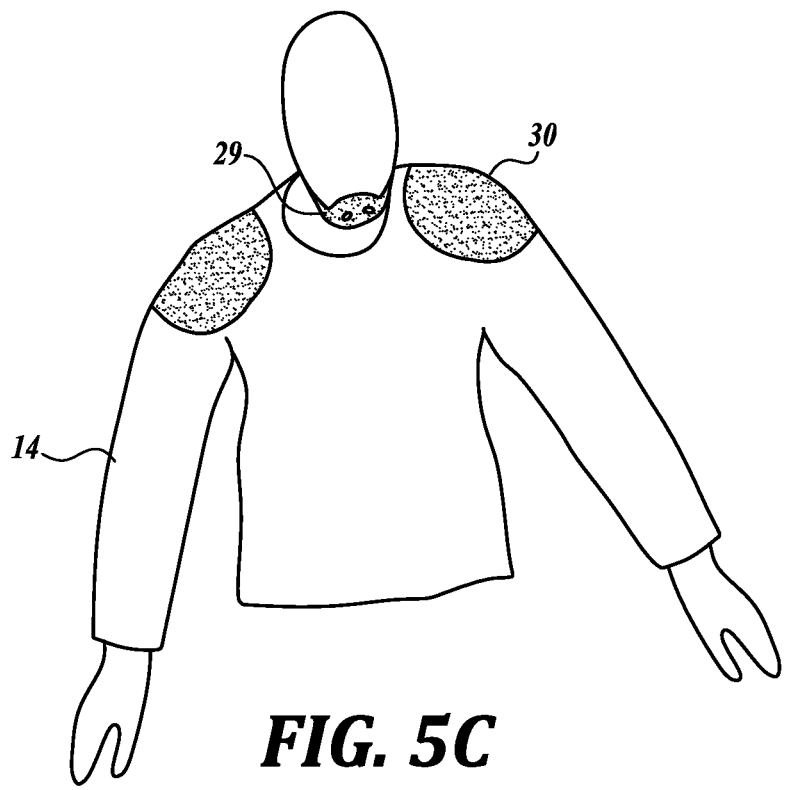
FIG. 5C is a representative configuration of the impact mitigating membrane of FIG. 1, showing a shoulder and chin protection configuration.
Figure 5D:
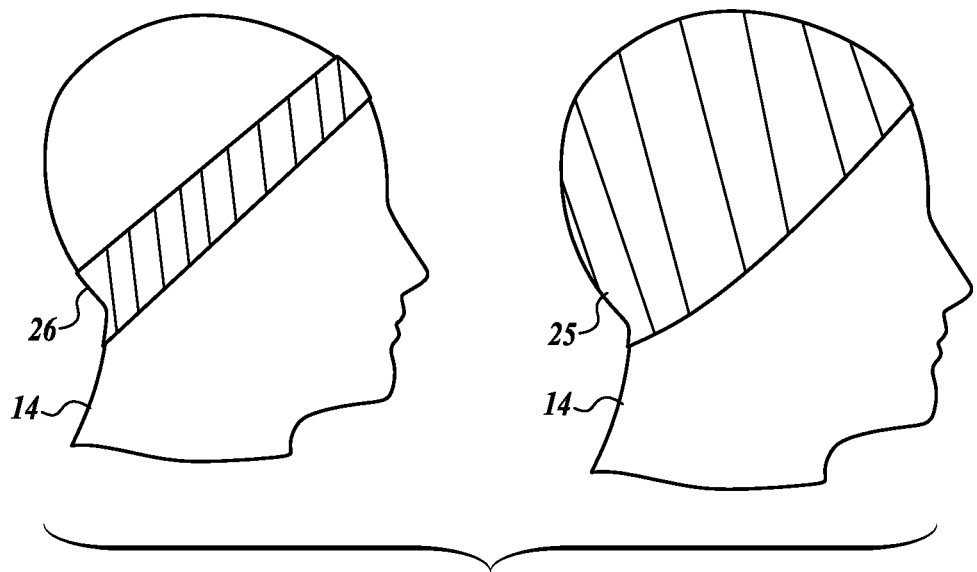
FIG. 5D is a representative configuration of the impact mitigating membrane of FIG. 1, showing two head protection configurations.
Figure 5E:
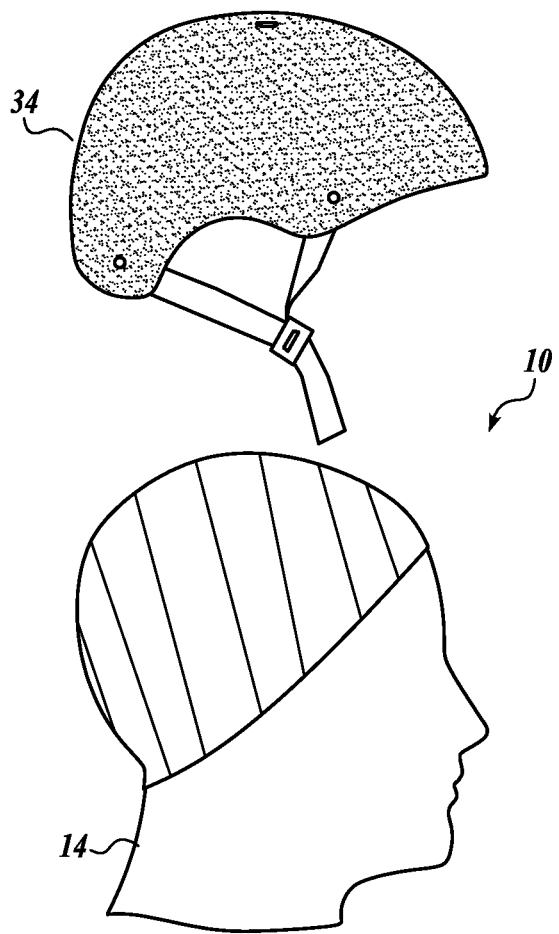
FIG. 5E is a representative configuration of the impact mitigating membrane of FIG. 1, showing a head protection configuration placed inside a helmet.

In some embodiments, the impact mitigating membrane 10 is shown incorporated into apparel, such as headwear in FIGS. 5D and 5E, covering at least a portion of the head, shown as object 14. In further embodiments, the impact mitigating membrane 10 is shown incorporated into other apparel such as elbow pads 31 having a strap 32 in FIG. 5A, knee pads 28a or foot pads 28b in FIG. 5B, and chin guards 29 or shoulder pads 30 in FIG. 5C.

As noted above, in some embodiments, portions of the first encapsulating layer 11 and second encapsulating layer 12 are suitably attached using the anchoring attachment 20 to constrain the floatation of the laminar core 13. In further embodiments, attachment of the first encapsulating layer 11 and second encapsulating layer 12 is suitably located around the perimeter of the laminar core 13 in conjunction or independently from the anchoring attachment 20. In these embodiments, the attachment may optionally incorporate one or more apertures 36 in the laminar core 13. In some embodiments, the anchoring attachment 20 is configured to provide constrained floatation when the aperture 36 has a diameter larger than the anchoring attachment 20. Constrained floatation can also be provided when the anchoring attachment 20 is used with the tether 22, as show in FIGS. 7B and 7C.

Figure 8:
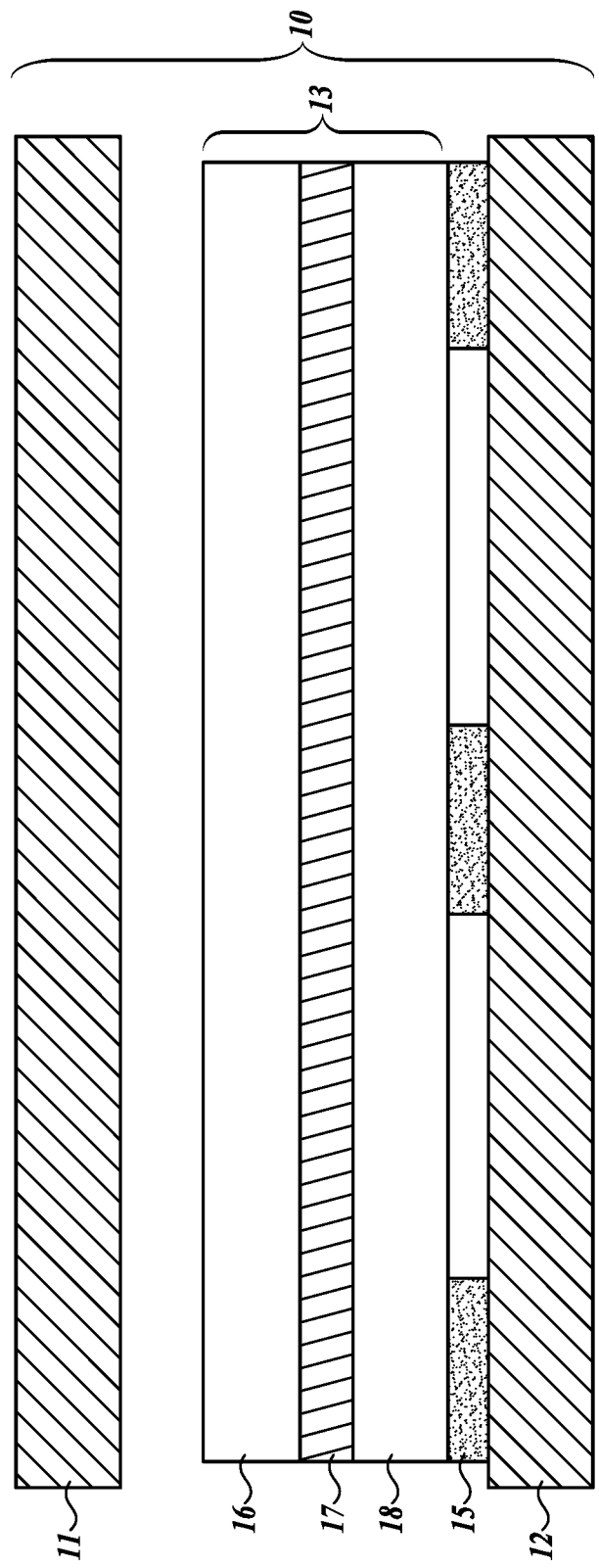
FIG. 8 is a cross-sectional view of another representative embodiment of the impact mitigating membrane in accordance with another aspect of the present disclosure, showing fasteners positioned between the second encapsulating layer and the bottom of the laminar core.
Figure 9:
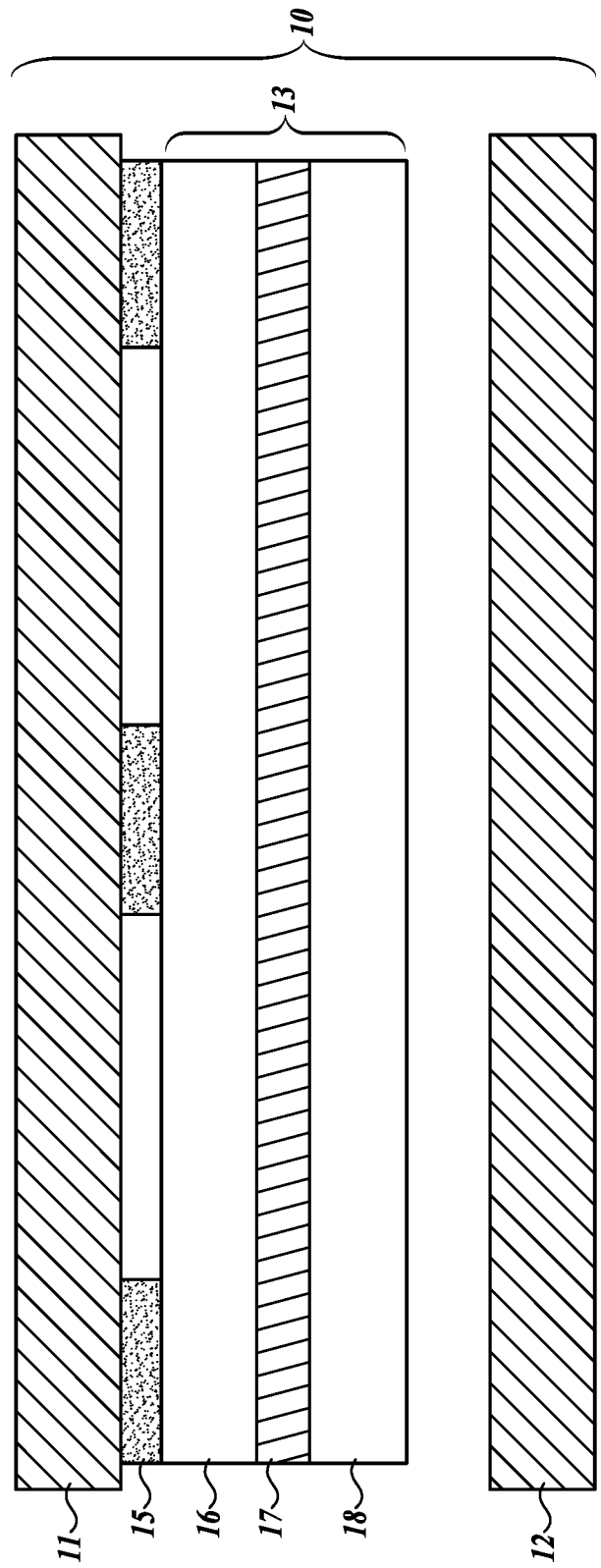
FIG. 9 is a cross-sectional view of another representative embodiment of the impact mitigating membrane in accordance with another aspect of the present disclosure, showing fasteners positioned between the first encapsulating layer and the bottom of the laminar core.
Figure 10:
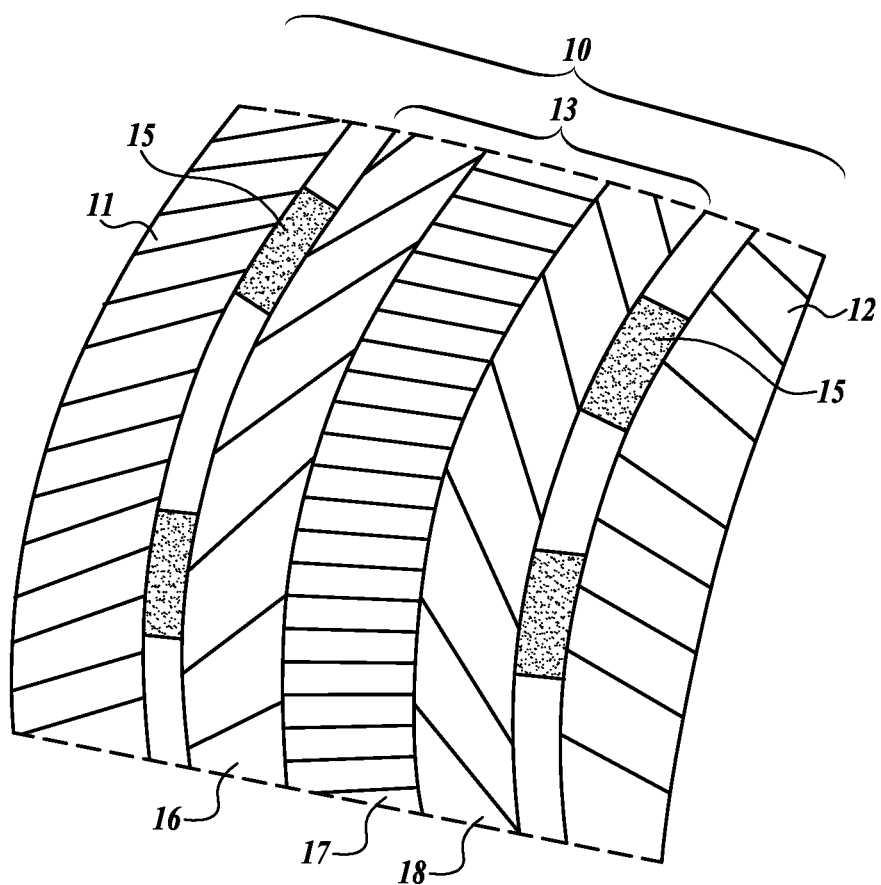
FIG. 10 is a cross-sectional view of another representative embodiment of the impact mitigating membrane in accordance with another aspect of the present disclosure, showing fasteners positioned between the first and second encapsulating layers and the laminar core.

In some embodiments, the laminar core 13 is suitably connected or integrated to the second encapsulating layer 12 (as shown in FIG. 8), first encapsulating layer 11 (as shown in FIG. 9), or both (as shown in FIG. 10) using a suitable chemical or mechanical fastener 15, or combination of both. The fastening configuration suitably includes, but is not limited to, adhesive, buttons, elastic bands, rivets, fusion, thread using any sewing technique, hook and loop, radio frequency welding, ultrasonic welding, and impulse sealing.

Figure 11A:
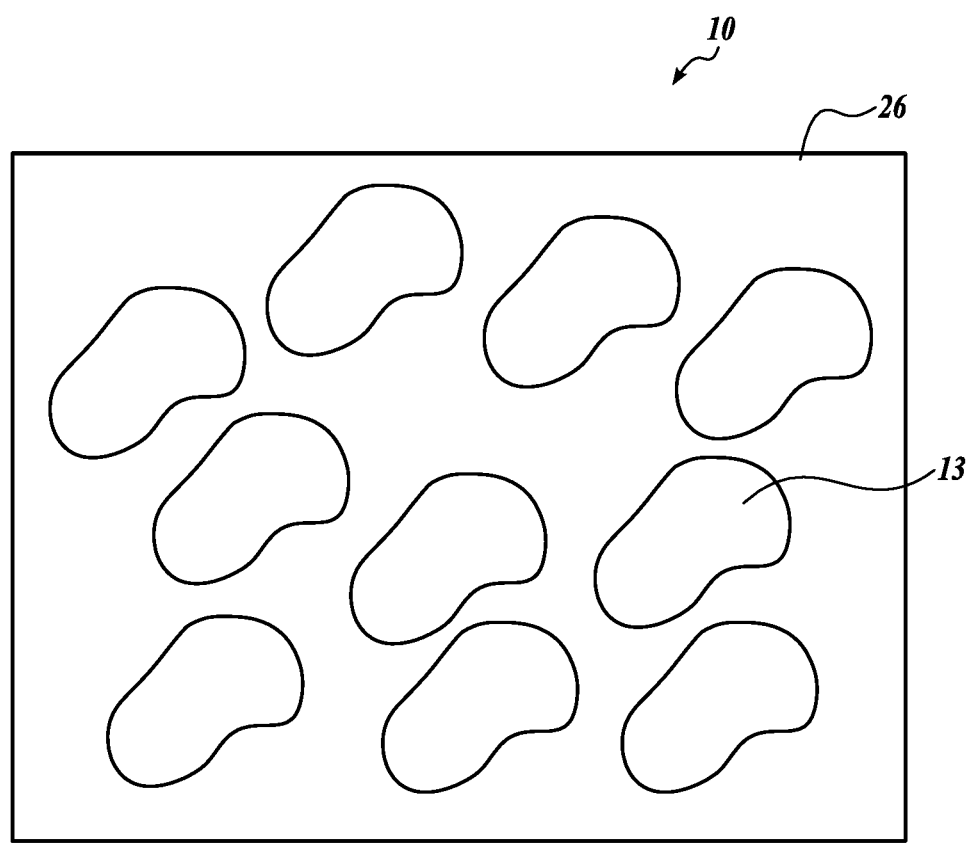
FIG. 11A is a top view of a plurality of impact mitigating membranes of FIG. 1, showing an embodiment of the impact mitigating membranes having an irregular shape.
Figure 11B:
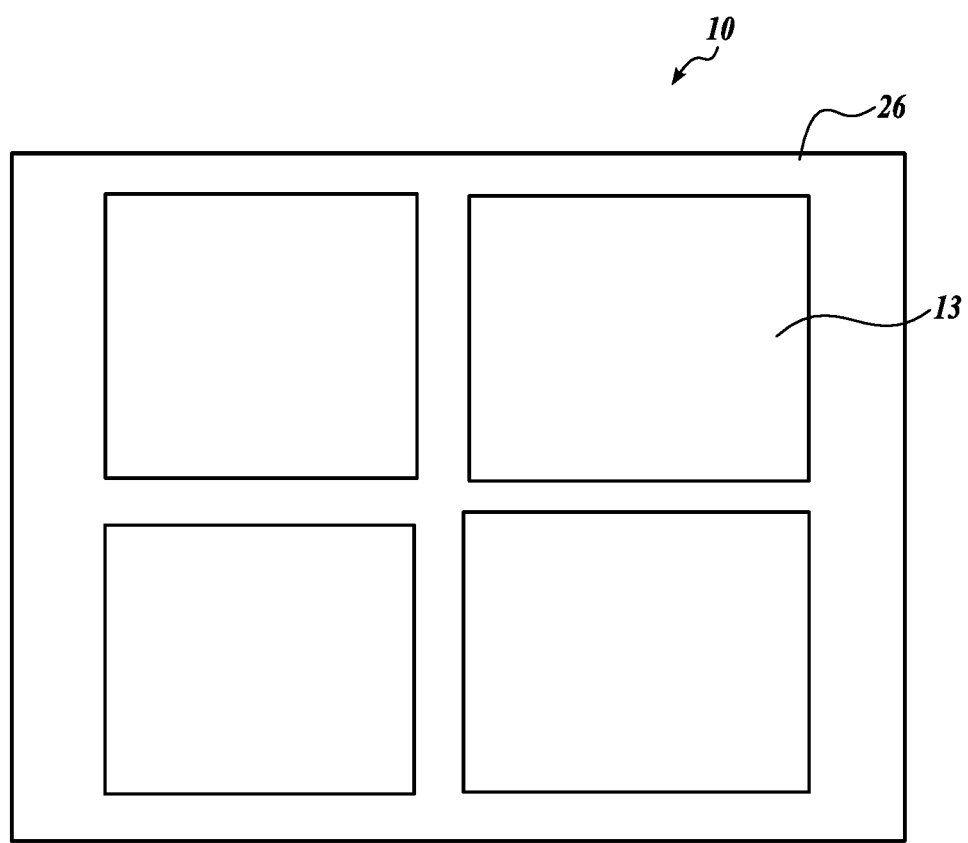
FIG. 11B is a top view of a plurality of impact mitigating membranes of FIG. 1, showing an embodiment of the impact mitigating membranes having a rectangular shape.

As noted above, at least a portion of the first lamina 16 and the second lamina 18 are attached to form compartments for the laminar core 13 that selectively contain the intermediate lubricating layer 17 and the fastener 19. FIGS. 11A and 11B show the top view of representative embodiments of the impact mitigating membrane 10, with the laminar core 13 is placed in regular or irregular spacing patterns on an encapsulating layer 26. In the illustrated embodiments, the encapsulating layer 26 is the first encapsulating layer 11. The second encapsulating layer 12 is not shown for clarity, such that the placement and positioning of a representative embodiment of the laminar core 13 can be viewed. In this regard, The impact mitigating membrane 10 would include the first encapsulating layer 11, the second encapsulating layer 12, and a plurality of laminar cores 13, as shown. The configurations shown in FIGS. 11A and 11B are suitable to improve the ability of the impact mitigating membrane to conform to the surface of different objects 14 as well as increase the ability for air circulation through the impact mitigating membrane 10.

Figure 5F:
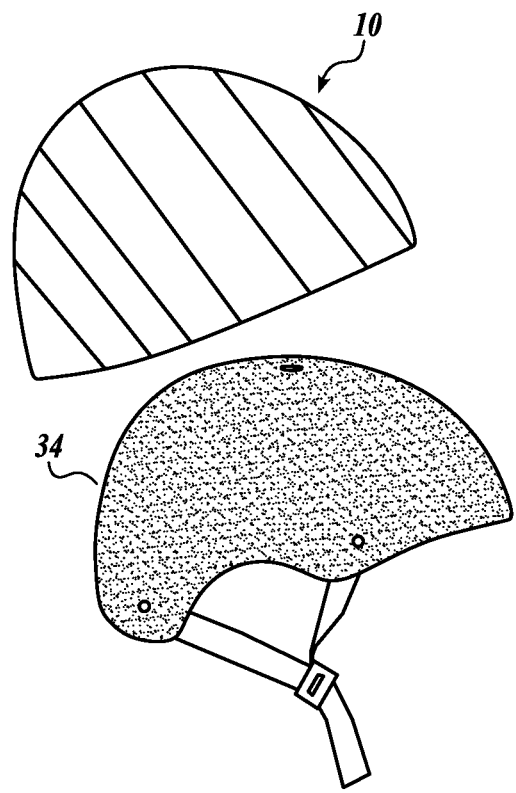
FIG. 5F is a representative configuration of the impact mitigating membrane of FIG. 1, showing a head protection configuration placed outside a helmet.

In another embodiment, the impact mitigating membrane 10 is configured to conform to the shape of the outside or inside of protective equipment 34 to be worn such as inside the protective equipment 34 (FIG. 5E), outside the protective equipment (FIG. 5F), or as a layer in between, to protect an object 14.

In another embodiment, the impact mitigating membrane 10 is suitably used as a built-in component of a protective gear which can be embedded in the exterior surface of the equipment, interior surface of the equipment, or any surface in-between. In this regard, the materials may suitably be weatherproof and waterproof. In one embodiment, the impact mitigating membrane 10 is suitably coupled to the fitting liner of the protective equipment, or replaces the fitting liner of the protective equipment.

In another embodiment, the impact mitigating membrane 10 can be used on the exterior or the interior of any powered or non-powered vehicle, including, but not limited to cars, motorcycles, airplanes, buses, trucks, ships, and wheelchairs.

In accordance with one embodiment of the present disclosure, an impact mitigating membrane is provided. The impact mitigating membrane generally includes two constraining layers that allow the impact mitigating membrane to act similarly to a fabric, having a first encapsulating layer consisting of one or more layers that faces the impacting object and a second encapsulating layer comprising one or more layers that face the protected object; and a laminar core having a plurality of components which disengage the impacting object from the protected object by allowing the first encapsulating layer to slide relative to the second encapsulating layer, wherein the impact mitigating membrane is configured to reduce rotational acceleration caused by an oblique impact by means of disengaging the first encapsulating layer from the second encapsulating layer; and wherein the impact mitigating membrane is configured to reduce linear acceleration due to impact by allowing the impact force to spread over a larger area of the impacted surface.

In accordance with any of the embodiments described herein, the laminar core may further include at least three layers: a first lamina, a second lamina, and a lubricating layer, wherein the first lamina and the second lamina can move relative to each other by means of the lubricating layer in between, wherein the lubricating layer can be in any state of gas, liquid, solid, colloid, ferrofluid, or any combination thereof, wherein the lubricating layer can be any one or a combination of Newtonian fluids and non-Newtonian fluids, wherein the first lamina and the second lamina are manufactured from an elastic or conformable or stretchable or rigid material that can elongate or rupture when the impact force exceeds a threshold.

In accordance with any of the embodiments described herein, the impact mitigating membrane may constrain the laminar core wherein the second encapsulating layer and the first encapsulating layer are attached through mechanical or chemical means, including, but not limited to adhesive, buttons, elastic bands, rivets, fusion, sewing techniques, hook and loop, RF welding, ultrasonic welding, thermal impulse sealing, and any combination thereof.

In accordance with any of the embodiments described herein, the laminar core may incorporate apertures, openings, or holes through which the first encapsulating layer and second encapsulating layer are fastened together in order to constrain the laminar core, through chemical or mechanical means including, but not limited to adhesive, buttons, fusion, sewing techniques, hook and loop, RF welding, ultrasonic welding, thermal impulse sealing, and any combination thereof.

In accordance with any of the embodiments described herein, the laminar core may be constrained around its perimeter by a fastening between the first encapsulating layer and the second encapsulating layer, through mechanical or chemical means, including, but not limited to adhesive, buttons, elastic bands, rivets, fusion, sewing techniques, hook and loop, RF welding, ultrasonic welding, thermal impulse sealing, and any combination thereof.

In accordance with any of the embodiments described herein, the first lamina and the second lamina of the laminar core may be attached at one or more locations by means of mechanical or chemical fasteners including, but not limited to adhesive, buttons, elastic bands, rivets, fusion, sewing techniques, hook and loop, RF welding, thermal impulse sealing, and any combination thereof.

In accordance with any of the embodiments described herein, the laminar core may be made from groups of identical or different laminated (stacked) lamina.

In accordance with any of the embodiments described herein, the laminar core may be separated into multiple modules that can be connected by the first and second encapsulating layers.

In accordance with any of the embodiments described herein, the first encapsulating layer and second encapsulating layer can spread the oblique impact force over a larger area by incorporating layers of energy absorbing materials, air cushion, or a non-Newtonian material.

In accordance with any of the embodiments described herein, the first encapsulating layer and second encapsulating layer are configured for ventilation around the perimeters and openings in the laminar core.

In accordance with any of the embodiments described herein, the first encapsulating layer can be attached to the laminar core by a mechanical or chemical fastener including but not limited to adhesive, buttons, elastic bands, rivets, fusion, sewing techniques, hook and loop, RF welding, ultrasonic welding, thermal impulse sealing, and any combination thereof, or by any other means that can be used to connect layers together at one or more locations.

In accordance with any of the embodiments described herein, the second encapsulating layer can be attached to the laminar core by a mechanical or chemical fastener including but not limited to adhesive, buttons, elastic bands, rivets, fusion, sewing techniques, hook and loop, radio frequency welding, thermal impulse sealing or by any other means that can be used to connect layers together at one or more locations.

In accordance with any of the embodiments described herein, the second encapsulating layer can be integrated with the second lamina of the laminar core.

In accordance with any of the embodiments described herein, the first encapsulating layer can be integrated with the first lamina of the laminar core.

In accordance with any of the embodiments described herein, the first encapsulating layer is configured to contain logos, trademarks, reflective or glowing materials, or description labels.

In accordance with any of the embodiments described herein, the impact mitigating membrane is implemented in conjunction with a body protector such as headgear, knee protector, foot protector, shoulder protector, ankle guard, wearable apparel, neck protector, chin protector, elbow protector, shin protector, forearm protector, wrist protector, chest protector, hip protector, body armor, or any other protective equipment.

In accordance with any of the embodiments described herein, the impact mitigating membrane is integrated within a body protector such as headgear, knee protector, footwear protector, shoulder protector, ankle guard, wearable apparel, neck protector, chin protector, elbow protector, shin protector, forearm protector, wrist protector, chest protector, hip protector, body armor, or any other protective equipment.

In accordance with any of the embodiments described herein, the impact mitigating membrane may be integrated with a designated attachment method for the purpose of coupling it with protective equipment.

In accordance with any of the embodiments described herein, the impact mitigating membrane has no designated attachment to be associated with protective equipment.

In accordance with any of the embodiments described herein, the impact mitigating membrane is worn as an accessory underneath protective equipment; wherein the impact mitigating membrane covers at least a portion of the object to be protected.

In accordance with any of the embodiments described herein, the impact mitigating membrane is a stand-alone headwear or headgear which covers at least a portion of the user's head.

In accordance with any of the embodiments described herein, the impact mitigating membrane is worn over protective equipment.

In accordance with any of the embodiments described herein, the impact mitigating membrane can be attached temporarily or permanently to the interior or exterior surfaces of a protective equipment or any other layer between interior and exterior surfaces of the protective equipment by means of mechanical or chemical fasteners including but not limited to adhesive, buttons, elastic bands, rivets, fusion, sewing techniques, hook and loop, radio frequency sealing, ultrasonic welding, thermal impulse sealing, and any combination thereof.

In accordance with any of the embodiments described herein, the impact mitigating membrane can be used in exterior or interior of any powered or non-powered device used for transporting goods and human including but not limited to vehicles, airplanes, and ships.

In accordance with any of the embodiments described herein, the first encapsulating layer and second encapsulating layers can comprise any stretchable, rigid, partially stretchable material, or any combination thereof.

In accordance with any of the embodiments described herein, each of the first encapsulating layer, second encapsulating layer, and laminar core can be made of any breathable, weatherproof, or waterproof material.

In accordance with any of the embodiments described herein, the materials used in each of the layers can be any one or more fabrics (such as those containing cotton, synthetic fabrics, polyester, silk, linen, wool, nylon, spandex, and other materials), thermosetting plastics, polycarbonate, plastic polymers, thermoplastics, carbon fiber composites, KEVLAR® composites, thermoset elastomers, CELSTRAN®, Polypropylene, ABS, EPS, high density polyethylene, glass reinforced plastics, ZYTEL®, or any other energy absorbing or force spreading material which includes but is not limited to silicon rubber, vinyl, polyvinyl chloride (PVC), thermoplastic polyurethane (TPU), polyurethane (PU).

In accordance with any of the embodiments described herein, further comprising a comforting layer integrated to the second encapsulating layer or first encapsulating layer.

In accordance with any of the embodiments described herein, the impact mitigating membrane can contain communication devices, embedded systems, inertial sensors, inertial navigation systems, vital signs monitoring systems, shock indicators, or any other activity monitoring systems.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An impact mitigating membrane conformable to a surface of an object, comprising:
   a laminar core, comprising:
      a first lamina;
      a second lamina configured to shift relative to the first lamina, the second lamina coupled to the first lamina at a perimeter of an aperture defined in the laminar core; and
      a lubricating layer disposed between the first lamina and the second lamina and configured to reduce friction between the first lamina and the second lamina;
   a first encapsulating layer positioned adjacent the first lamina;
   a second encapsulating layer positioned adjacent the second lamina; and
   an anchoring attachment extending through the aperture in the laminar core and coupled to at least one of the first encapsulating layer or the second encapsulating layer, the anchoring attachment configured to constrain relative lateral motion between the laminar core and at least one of the first or second encapsulating layers,
   wherein the first encapsulating layer and the second encapsulating layer together surround the laminar core, and wherein the shift of the first lamina relative to the second lamina dissipates kinetic energy resulting from an impact force to the impact mitigating membrane.

2. The impact mitigating membrane of claim 1, wherein the first lamina is coupled to the second lamina at a perimeter of the laminar core.

3. The impact mitigating membrane of claim 1, wherein the lubricating layer is selected from the group consisting of a gas, a liquid, a solid, a colloid, a ferrofluid, and combinations thereof.

4. The impact mitigating membrane of claim 1, wherein the first lamina and the second lamina are manufactured from elastic, stretchable, or rigid materials that are capable of elongation to a point of rupture when the impact force exceeds a threshold.

5. The impact mitigating membrane of claim 1, wherein the coupling of the first lamina and the second lamina is selected from the group consisting of mechanical fasteners, chemical fasteners, adhesive, buttons, elastic bands, rivets, fusion, thread, hook and loop, radio frequency seal, ultrasonic weld, thermal impulse seal, and combinations thereof.

6. The impact mitigating membrane of claim 1, wherein the anchoring attachment is selected from the group consisting of mechanical fasteners, chemical fasteners, elastic band, rivets, adhesive, buttons, fusion, thread, hook and loop, radio frequency seal, ultrasonic weld, thermal impulse seal, and combinations thereof.

7. The impact mitigating membrane of claim 6, wherein the first lamina is coupled to the second lamina at a perimeter of the laminar core.

8. The impact mitigating membrane of claim 1, wherein the first encapsulating layer is coupled to the first lamina by one or more fasteners selected from the group consisting of mechanical fasteners, chemical fasteners, adhesive, buttons, elastic bands, rivets, fusion, thread, hook and loop, radio frequency seal, ultrasonic weld, thermal impulse seal, and combinations thereof.

9. The impact mitigating membrane of claim 1, wherein the second encapsulating layer is coupled to the second lamina by one or more fasteners selected from the group consisting of mechanical fasteners, chemical fasteners, adhesive, buttons, elastic bands, rivets, fusion, thread, hook and loop, radio frequency seal, ultrasonic weld, thermal impulse seal, and combinations thereof.

10. The impact mitigating membrane of claim 1, wherein a fastener is used to define the coupling of the first lamina and the second lamina at the perimeter of the aperture.

11. The impact mitigating membrane of claim 1, wherein more than one laminar core is enclosed within the first encapsulating layer and the second encapsulating layer.

12. The impact mitigating membrane of claim 1, wherein the first encapsulating layer is integrated with the first lamina.

13. The impact mitigating membrane of claim 1, wherein the second encapsulating layer is integrated with the second lamina.

14. The impact mitigating membrane of claim 1, wherein the object is a protective equipment, the impact mitigating membrane further comprising a coupling feature configured to attach the impact mitigating membrane to the protective equipment.

15. The impact mitigating membrane of claim 1, wherein a padded layer is integrated into at least one of the first or second encapsulating layers.

16. An impact mitigating membrane conformable to a surface of an object, comprising:
 a laminar core comprising:
  a first lamina;
  a second lamina coupled to the first lamina and configured to shift relative to the first lamina; and
  an aperture through the first lamina and the second lamina, the first lamina coupled to the second lamina at a perimeter of the aperture, the aperture configured to receive an anchoring attachment therethrough;
 a first encapsulating layer positioned adjacent the first lamina;
 a second encapsulating layer positioned adjacent the second lamina, the second encapsulating layer coupled to the first encapsulating layer through the anchoring attachment to constrain relative lateral motion between the laminar core and at least one of the first or second encapsulating layers,
 wherein the first encapsulating layer and the second encapsulating layer together surround the laminar core, and wherein the shift of the first lamina relative to the second lamina dissipates kinetic energy resulting from an impact force to the impact mitigating membrane, thereby reducing acceleration transferred to the object.

17. The impact mitigating membrane of claim 16, further comprising a lubricating layer disposed between the first lamina and the second lamina configured to reduce friction between the first lamina and the second lamina, the lubricating layer selected from the group consisting of a gas, a liquid, a solid, a colloid, a ferrofluid, and combinations thereof.

18. An impact mitigating membrane conformable to a surface of an object, comprising:
 a laminar core, comprising:
  a first lamina;
  a second lamina configured to shift relative to the first lamina; and
  a lubricating layer disposed between the first lamina and the second lamina and configured to reduce friction between the first lamina and the second lamina;
 a first encapsulating layer positioned adjacent the first lamina;
 a second encapsulating layer positioned adjacent the second lamina; and
 a tether coupled to the laminar core and at least one of the first encapsulating layer or the second encapsulating layer, wherein an anchoring attachment extends through the tether and at least one of the first encapsulating layer or the second encapsulating layer, the tether configured to constrain relative lateral motion between the laminar core and at least one of the first or second encapsulating layers,
 wherein the first encapsulating layer and the second encapsulating layer together surround the laminar core, wherein the shift of the first lamina relative to the second lamina dissipates kinetic energy resulting from an impact force to the impact mitigating membrane, wherein the second lamina is coupled to the first lamina at a perimeter of an aperture defined in the laminar core, and wherein the tether passes through the aperture.

\* \* \* \* \*